E. L. BARNES.
UNDERGROUND STEAM DISTRIBUTING SYSTEM.
APPLICATION FILED MAY 15, 1909.
997,434.
Patented July 11, 1911.
2 SHEETS—SHEET 1.
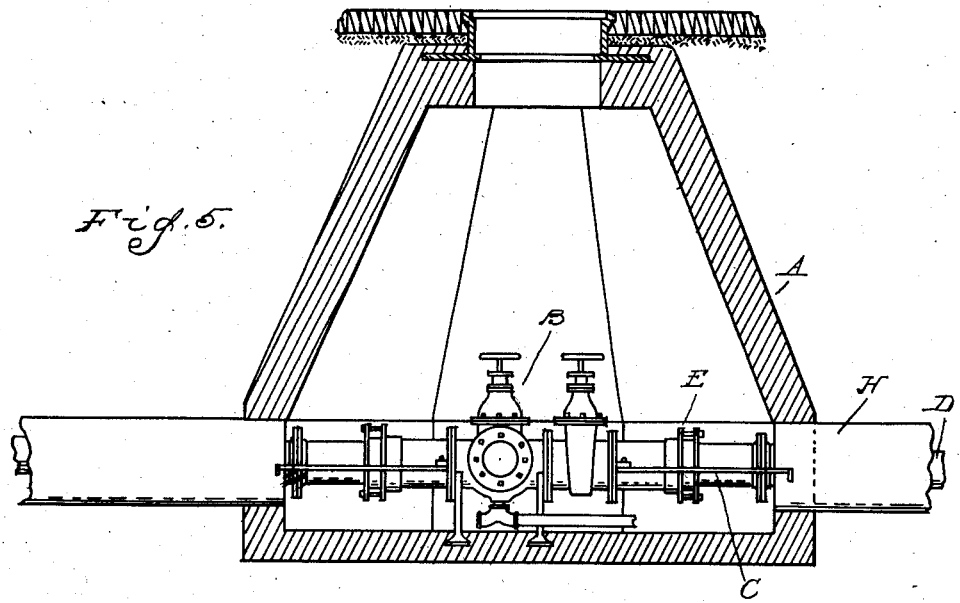
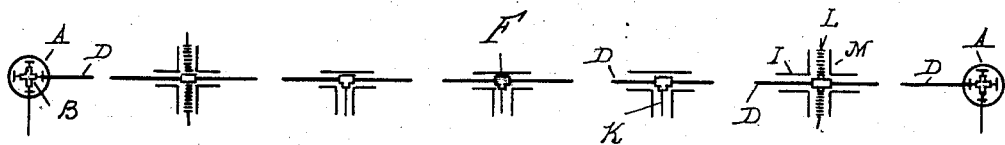

E. L. BARNES.
UNDERGROUND STEAM DISTRIBUTING SYSTEM.
APPLICATION FILED MAY 15, 1909.
997,434.
Patented July 11, 1911.
2 SHEETS—SHEET 2.
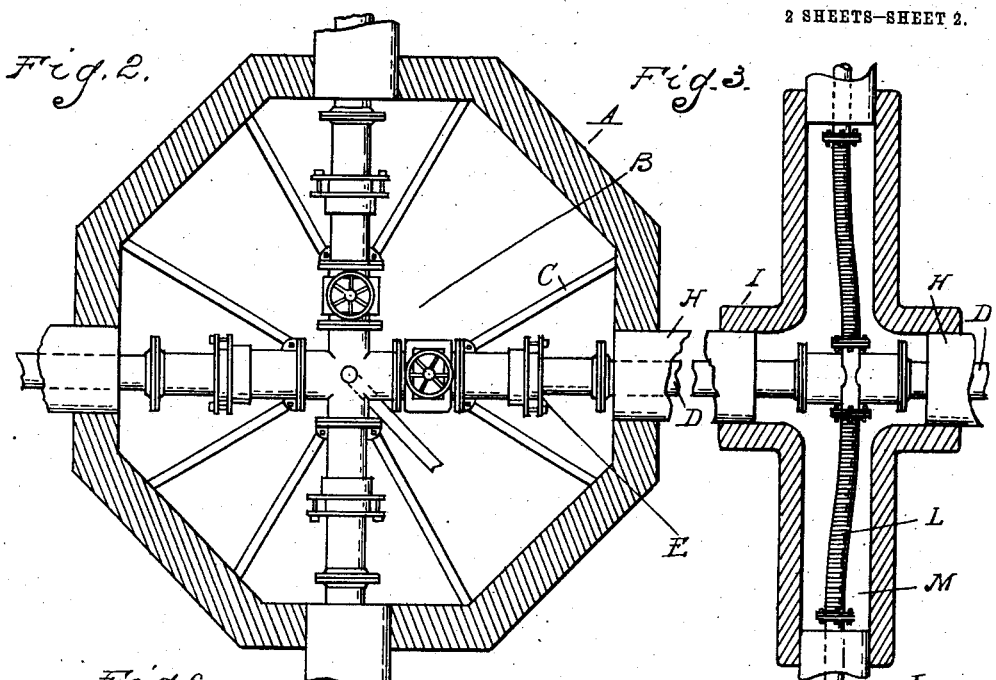
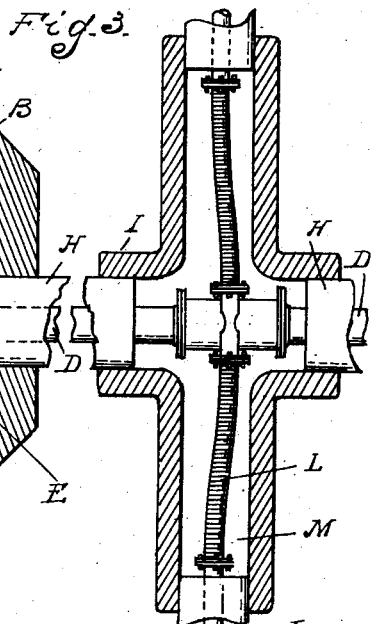
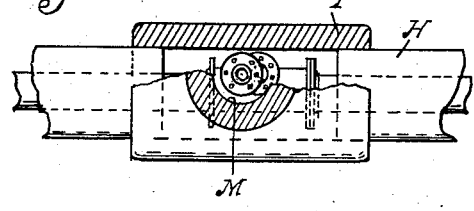
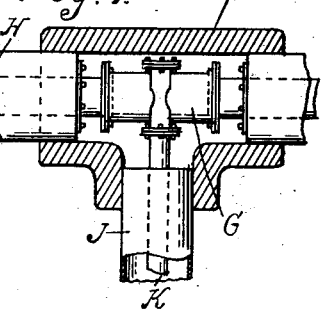
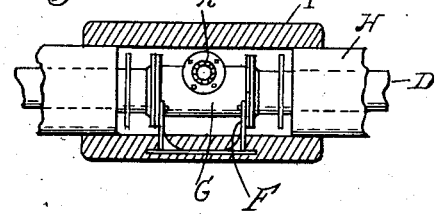
Witnesses
Inventor
Eugene L. Barnes
By
Attys.

UNITED STATES PATENT OFFICE.

EUGENE L. BARNES, OF DETROIT, MICHIGAN.

UNDERGROUND STEAM-DISTRIBUTING SYSTEM.

997,434. Specification of Letters Patent. Patented July 11, 1911.

Application filed May 15, 1909. Serial No. 496,315.

*To all whom it may concern:*

Be it known that I, EUGENE L. BARNES, a citizen of the United States of America, residing at Detroit, in the county of Wayne and State of Michigan, have invented certain new and useful Improvements in Underground Steam - Distribution Systems, of which the following is a specification, reference being had therein to the accompanying drawings.

The invention relates to systems for the distribution of steam, and it is the object of the invention to cheapen the cost of the construction more particularly by avoiding the use of expansion joints in the main conduit between the various service connections.

To this end the invention consists in the novel construction by which provision is made for expansion and contraction of the main conduit without injurious stress upon the service connections, and also without the use of intermediate expansion joints.

The invention further consists in various features of construction as hereinafter set forth.

In the drawings—Figure 1 is a diagrammatic plan view of the system; Fig. 2 is a horizontal section through one of the manholes; Figs. 3 and 4 are similar sections through the conduit at various points of the service connection; Figs. 5, 6 and 7 are vertical sections corresponding respectively to Figs. 2, 3 and 4.

In the laying of underground steam distributing systems, it is customary to provide manholes at certain intervals, as for instance the street intersections, and intermediate these a number of service connections. As these service connections extend preferably at right angles to the main conduit provision must be made for expansion and contraction of the main, and this is usually accomplished by the arranging of an expansion joint at or midway between adjacent service connections. Thus the sections of the main conduit are permitted to move longitudinally but the points of the service connection are anchored and remain stationary, and, therefore, no injurious stress is placed upon the laterally-extending conduit. Such a system is, however, an expensive one to install on account of the large number of expansion joints necessary, and, furthermore, these expansion joints frequently get out of order, and thus the cost of repair and maintenance is large.

With my improved construction I have avoided the use of expansion joints, with exception of those located in the manhole where they are of easy access. This, of course, necessitates provision for movement of the main conduit at various points of the service connection, but this I have provided for by the construction which will now be described.

As illustrated, A are the manholes, in which are arranged the stationary conduit fitting B—such, for instance, as a tee or cross—which may be anchored by suitable means—such as the braces C.

D are the main conduit sections extending outward from the manhole, and these are coupled with the fitting B through the medium of an expansion or slip joint connection E. This expansion coupling is capable of taking care of the maximum expansion occurring in one-half of the length of the conduit between adjacent manholes, and at the central point an anchored service connection F is located. Intermediate this point and the manholes are arranged a number of adjacent service connections, which differ in construction according to the location, as follows:

In Fig. 4 is shown a construction designed for use where the maximum amount of travel, by reason of the expansion, is comparatively limited, or—in other words—it is a fitting designed for use at points not far removed from the anchored service connection. This fitting G may be either a tee or a cross, preferably the latter, and where only one service connection is drawn off, the other opening may be capped. H is the heat insulating protecting conduit surrounding the steam conduit D, and I is a tee or cross for the insulating conduit, which connects it with the laterally-extending insulating conduit J for the service connection. The conduit J is of larger diameter than the steam service pipe K therein, and thus provides clearance for a lateral movement of the steam pipe, due to the longitudinal movement of the main steam pipe D. This clearance is calculated to be in excess of the maximum amount of deflection, and the pipe K is free from the outer conduit for a sufficient length to permit the required flexing. Thus in operation, the movement of the conduit D will only result in a slight flexing of the conduit K, and the movement thereof laterally in relation to the outer conduit J, but no injurious stress will be placed upon the coupling connection G.

In Fig. 3 is illustrated another construction of connection designed for use where the amount of travel of the main conduit D is considerable—as, for instance—the first service connection beyond a manhole. As the amount of movement at such a point is too great to be satisfactorily cared for by the flexing of the service connection, where an ordinary steam pipe is used, I have provided a special construction of flexible coupling between the main conduit and the service pipe. This connection L is preferably formed of a flexible metallic hose, which is arranged in the lateral extension M of the insulating conduit coupling I. The amount of clearance within the extension M is calculated to provide for the maximum movement of the flexible conduit L and thus no injurious stress is placed upon any of the parts.

With my improved system, service connections are preferably placed, in the laying of the main conduit, at regular intervals, and if not required for immediate use are capped. Thus whenever a new service connection is to be installed it is merely necessary to couple with the fitting G a connection of the required character, depending upon its location, and either a plain pipe or a flexible connecting conduit L.

What I claim as my invention is:

1. The combination with a main conduit, of consecutive manholes for the opposite ends of said conduit, expansion joints in said manholes, an anchor in said conduit intermediate said consecutive manholes, a series of service pipes distributed along the main conduit intermediate the anchored point and said consecutive manholes, and connections between said service pipes and the main conduit providing for the differential movement of the latter in expansion and contraction.

2. The combination with a main conduit, of consecutive manholes for the opposite ends of said conduit, expansion joints in said manholes, an anchor for said conduit intermediate said consecutive manholes, a laterally-extending service pipe intermediate said anchored point and one of said manholes, and a flexible connection between the service pipe and the main conduit.

3. The combination with the main conduit anchored intermediate its ends, and having expansion joints at opposite ends thereof, of a laterally extending service pipe intermediate said anchored point and one end of said main conduit, and connections between said service pipe and the main conduit providing for a differential traveling movement of the latter.

In testimony whereof I affix my signature in presence of two witneses.

EUGENE L. BARNES.

Witnesses:
NELLIE KINSELLA,
W. J. BELKNAP.